Patented Mar. 26, 1940

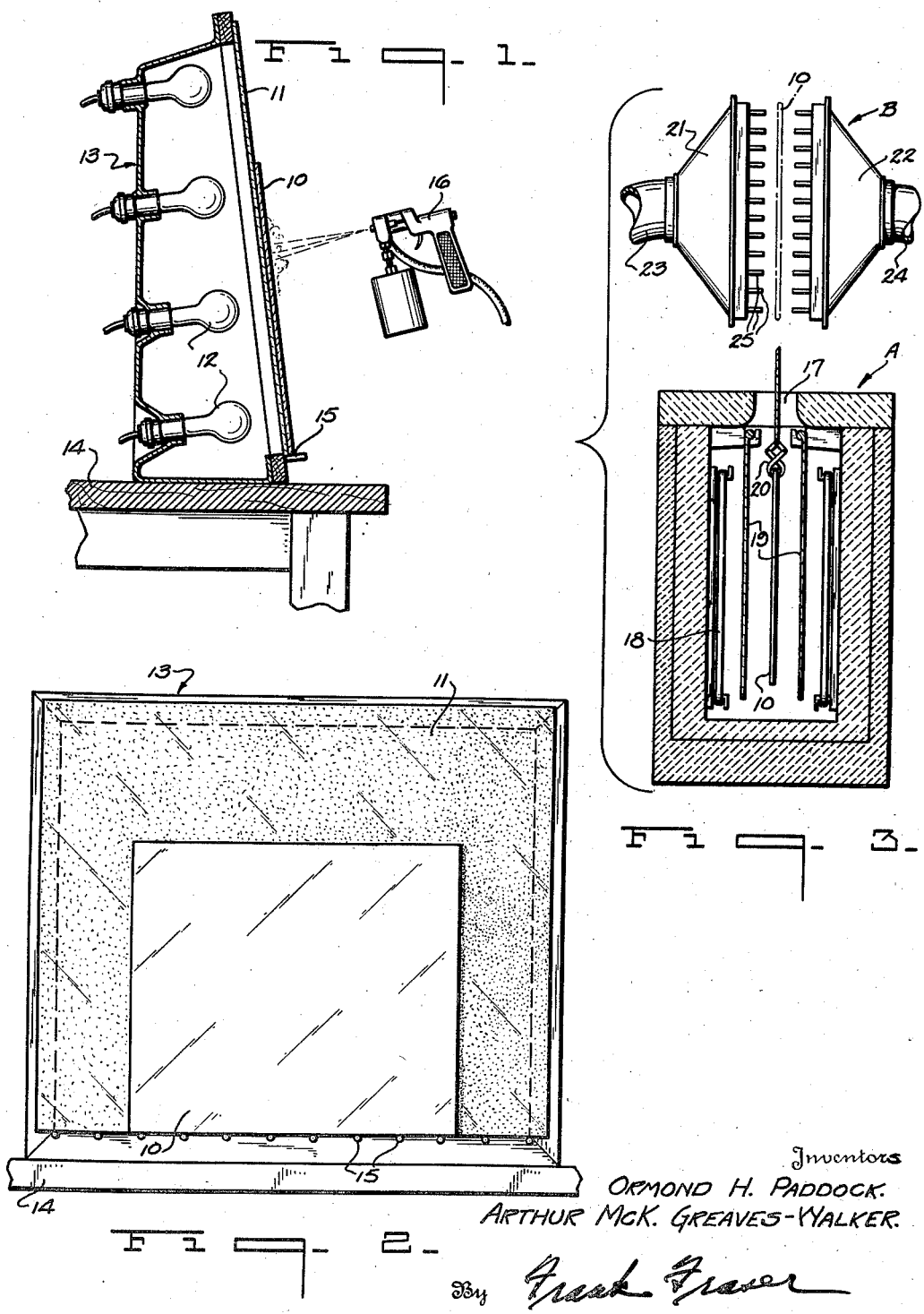

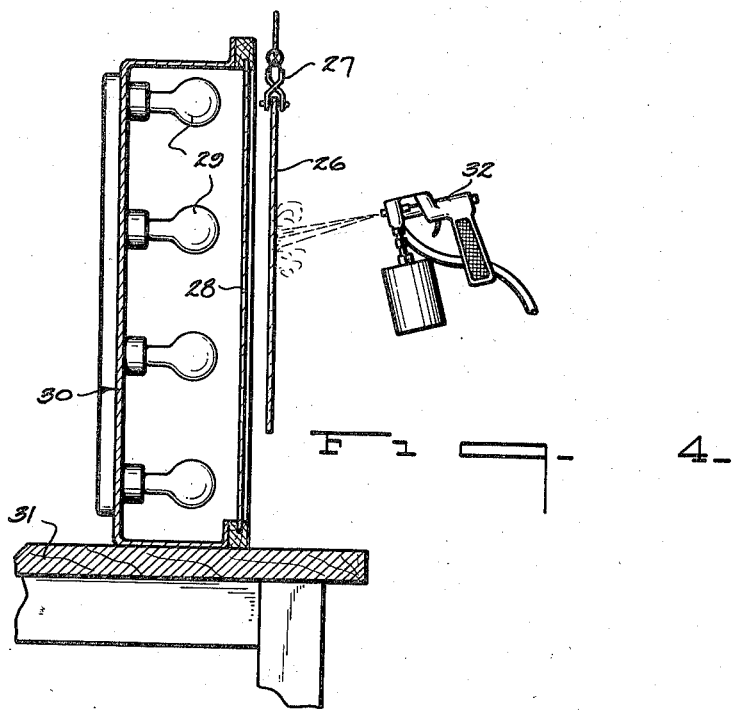
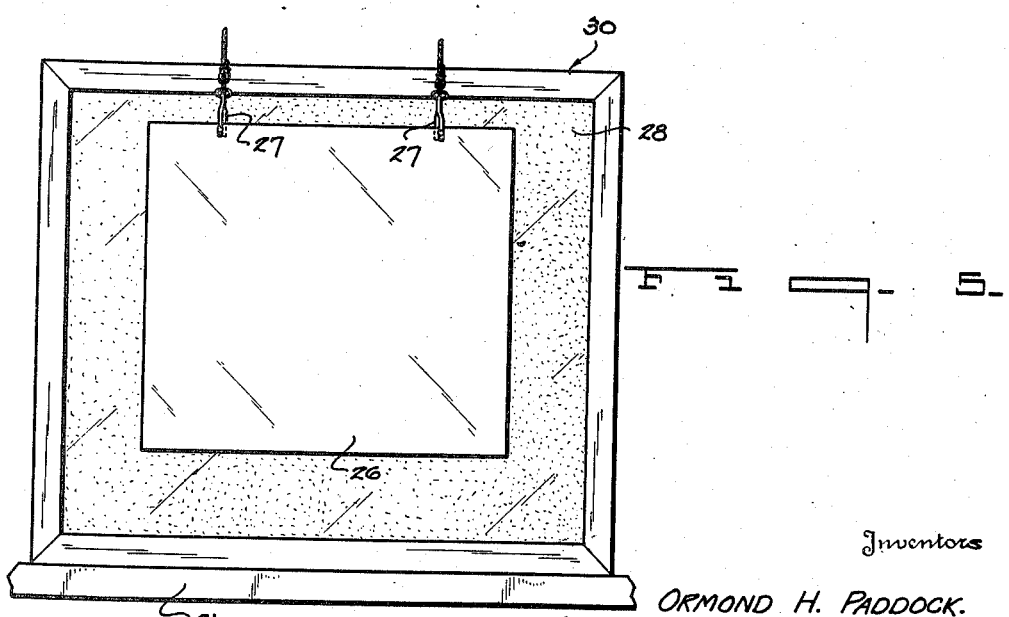

2,194,611

UNITED STATES PATENT OFFICE 2,194,611

METHOD OF COLORING VITREOUS ARTICLES AND PRODUCT PRODUCED THEREBY

Ormond H. Paddock and Arthur McK. Greaves-Walker, Toledo, Ohio, assignors to Libbey-Owens-Ford Glass Company, Toledo, Ohio, a corporation of Ohio Application February 21, 1936, Serial No. 65,040

10 Claims. (Cl. 49—77)

The present invention relates to a novel method of coloring the surface of vitreous articles, particularly glass sheets or plates, and to the article produced by such method.

An object of the invention is the provision of a method of coloring the surfaces of glass sheets or plates wherein the said sheets or plates are tempered simultaneously with and during the coloring thereof in a manner to greatly increase the mechanical strength of the glass and its resistance to fracture.

Another object of the invention is the provision of a method of producing colored tempered glass wherein the coloring of the surface of any predetermined surface portions of sheets or plates of glass is accomplished in a manner and with coloring material which will provide surfaces, the colors of which will have great permanency and durability.

A further object of the invention is the provision, as a new article of manufacture, of a sheet of surface colored tempered glass produced in accordance with the method herein described and possessing those novel characteristics to be more fully hereinafter set forth.

In the tempering of glass sheets or plates according to one known method, the sheets are first heated to approximately the point of softening of the glass and then suddenly chilled to place the outer surfaces of the said sheets under compression and the interiors thereof under tension. The treatment of glass sheets in this manner not only materially increases the mechanical strength of the glass, but further modifies its breaking characteristics in that, when broken, the sheet will disintegrate into innumerable small and relatively harmless particles instead of breaking into large dangerous pieces or slivers as is the case with ordinary glass sheets. That is to say, the tempering of the glass sheet produces strain therein at selected points whereby a selected and desired breaking pattern may be obtained.

The character or type of break obtained depends upon the time and temperature cycle followed in the tempering operations, and in order to set up the desired strains in the glass sheet whereby to produce this predetermined breaking pattern, it is essential that the sheet be heated for a predetermined length of time to a predetermined temperature and then cooled for a substantially predetermined length of time. Any variation in the time and temperature cycle, after it has once been established to obtain a desired type of break, will affect or modify the breaking pattern of the glass, or, in other words, the character of its burst. It is an aim of this invention to effect the surface coloring of the glass along with the tempering thereof without in any way affecting the regular tempering operations or altering the predetermined breaking pattern of the glass. We have discovered that this can be accomplished in a thoroughly practical and efficient manner by the use of coloring material possessing certain novel characteristics.

According to the invention, the coloring material, which consists of a frit enamel of the desired consistency, is first applied cold to the surface of the glass sheet or while both the glass sheet and the enamel solution are at room temperature. The coated sheet is then heated in a suitable furnace for a predetermined length of time to a predetermined temperature, after which it is removed therefrom and suddenly cooled or chilled as by directing a plurality of jets or streams of air against opposite surfaces thereof simultaneously whereby the outer surfaces of the sheet are placed under compression and its interior under tension. Simultaneous with the tempering of the glass, the layer of coloring enamel is fired thereon so that it becomes, in effect, an integral part thereof, rendering it of great permanency and durability.

Contrary to what might be expected, the layer of colored enamel upon the glass has no effect whatever upon the normal tempering operations nor does it in any way change or modify the breaking pattern of the glass. Furthermore, it is not necessary to alter in any way the time and temperature cycle to compensate for the presence of the colored enamel. Thus, enameled tempered sheets of glass will break in exactly the same manner as plain glass sheets similarly treated.

More specifically, the colored enamel used is of such a composition and of such character that the time and temperature required for properly firing the same upon the glass is the same as the time and temperature required for heating the glass preliminary to cooling. Further, the colored enamel is also of such composition and of such character that, after being fired upon the glass, it possesses the same coefficient of expansion and contraction as the glass. By employing an enamel of this type, the tempering and coloring operations can be performed simultaneously without either adversely affecting or in any way proving detrimental to the other. Also, due to the fact that the enamel and glass have the same coefficient of expansion and contraction, the liability of the enamel separating from the glass during the varying temperature conditions to which it is subjected when in use will be eliminated.

With reference to the accompanying drawings forming a part of this application and wherein like numerals are employed to designate like parts throughout the same, Fig. 1 is a transverse sectional view through one form of apparatus which may be used for supporting the glass sheet during the application of the colored enamel thereto, Fig. 2 is a front view thereof, Fig. 3 is a view of one form of tempering apparatus which may be used in carrying out the invention, the means for heating the glass sheets being shown in section and the cooling means in elevation, Fig. 4 is a transverse sectional view, showing another way in which the glass sheet may be supported during the application of the colored enamel thereto, and Fig. 5 is a front view thereof.

In producing surface colored tempered glass according to the invention, the glass sheet to be treated is first cut to size and edged, since after tempering the sheet cannot be cut or ground and polished without resulting in the complete shattering thereof. The surface of the sheet, which is adapted to receive the coloring material, is then thoroughly cleaned, and this is very important since if the glass is not clean and free of all oil and grease it will not "take" the coloring material. The sheet may first be cleaned with a suitable washing powder or a similar preparation to remove water marks, grease, etc., after which the sheet is preferably washed with a fifty percent alcohol solution; that is, a solution of equal parts of alcohol and water, the water being added to reduce the speed of evaporation of the solution.

After the sheet has been cleaned, it is ready for coloring and to facilitate the application of the coloring material thereto, the said sheet is supported in a substantially vertical position against a lighted background. As shown in Figs. 1 and 2, the glass sheet 10 to be colored is supported in a substantially vertical position against a lighted background 11 which consists of a relatively large sheet of glass, one surface of which is sandblasted or otherwise treated in order to diffuse the light directed upon the rear surface thereof by the electric lamps 12. The lamps 12 are carried by a frame 13 supported upon a table or bench 14. The frame 13 is provided closely adjacent the bottom thereof with a plurality of forwardly projecting, substantially horizontal pins 15 upon which the glass sheet 11, constituting the lighted background, is freely supported at its lower edge and also upon which the glass sheet 10 to be colored is supported, the said sheet 10 resting against the glass background 11.

As brought out above, the coloring material used consists of a frit enamel formed of vitrifiable material including as one of its components pulverized or powdered glass suspended in a liquid vehicle to form a solution of the desired consistency. The glass used in making the enamel is preferably a lead borosilicate or a lead borate glass, although other types of glasses of equally low fusing temperature may be employed. The liquid vehicle may consist of a highly volatile composition such as, for example, a mixture of alcohol and water. The glass frit is finely ground such as in a ball mill and should be sufficiently fine to pass through a 200-mesh screen.

It is also essential that the enamel be clean and free from grit.

The enamel solution containing the vitrifiable colors can then be applied to the glass sheet in any preferred manner such as by spraying the same thereon by means of an ordinary spray gun 16 as shown in Fig. 1. In applying the coat of vitrifiable colors, the operator moves the spray gun slowly back and forth over the glass sheet, and this operation is continued until a coating of the desired thickness has been built upon the glass. The supporting of the glass sheet in front of a lighted background during the application of the coloring material thereto is an important feature of the invention in that it permits the operator to more accurately judge the thickness and uniformity of the enamel coating applied to the glass.

The vitrifiable colors are applied cold to the surface of the glass sheet or while both the glass and enamel solution are at room temperatures. After the enamel coating of the desired thickness has been applied, it is permitted to air dry and under ordinary conditions will dry at room temperature in approximately one hour or, if desired, the drying may be accelerated by heating or by the use of a light air spray.

The colored glass sheet is then ready for tempering and, as brought out above, this is accomplished by first heating the sheet to approximately the point of softening of the glass and then suddenly chilling the same by blasts of air directed uniformly and evenly over both surfaces thereof at the same time. One form of tempering apparatus which may be used is shown in Fig. 3 and comprises a furnace, designated in its entirety by the letter A, while the means for subsequently chilling or quenching the sheet is designated generally by the letter B. The cooling means B is here shown as being arranged directly above the furnace A so that the glass sheet 10, after being heated within the furnace, can be transferred directly to the cooling means without any undue loss of heat and without being adversely affected by atmospheric conditions during the transfer.

The furnace A is here shown as being of the electrically heated type provided with a top opening 17 through which the glass sheet 10 to be treated may be inserted and removed. Any suitable covering can be provided for the opening 17 as will be readily understood. For the purpose of heating the furnace, electrical heating elements 18 may be used in conjunction with baffle plates 19 and by means of any conventional indicating and control mechanism, the temperature of the furnace can be regulated to heat the glass sheet to the desired temperature.

The glass sheet is preferably supported during the tempering thereof by means of a plurality of relatively small hooks or tongs 20 which engage opposite faces of the sheet closely adjacent its upper edge so that the said sheet is suspended therefrom in a vertical position.

When the glass sheet has been heated to the desired temperature within the furnace, it is lifted therefrom through the top opening 17 and subjected immediately to the action of the cooling means B, said means comprising spaced blower heads 21 and 22 connected by means of conduits 23 and 24 respectively to suitable blowers so that blasts of air can be directed simultaneously upon opposite surfaces of the glass sheet when brought into position between the said blower heads. Each blower head is provided with a plurality of nipples 25 through which jets of air are directed against the sheet.

As explained above, in order to obtain a desired predetermined breaking pattern if and when the tempered glass sheet is broken, it is essential that the sheet be subjected to a certain predetermined heating and cooling cycle. In other words, the type of breaking pattern obtained is intimately related to and in fact depends upon the treatment to which the glass is subjected. Thus, if an ordinary sheet of glass of one-quarter inch thickness is heated for five minutes to a temperature of 1250° F. and then cooled for a period of forty-five seconds, it will, when broken, have a very desirable type of break or burst. Therefore, in order to obtain this desired predetermined breaking pattern, the sheet is subjected to this particular heating and cooling cycle.

According to the invention, during the heating of the sheet to 1250° F. preliminary to cooling, the layer of coloring material is adapted to be simultaneously fired upon the glass so as to become, in effect, an integral part thereof.

Due to the novel characteristics of the coloring material, the firing thereof upon the glass sheet will be effected without in any way changing or modifying the breaking pattern of the glass were the coloring material not present. Thus, after determining the heating and cooling cycle required to obtain the desired type of break when tempering plain sheets of glass, colored sheets can then be tempered by using the same cycle. As pointed out above, contrary to what might be expected, the presence of the coloring material has no effect upon the breaking pattern of the sheet. In other words, the time and temperature cycle required for properly firing the vitrifiable colors upon the glass corresponds to the time and temperature cycle required for heating the glass preliminary to cooling. The coloring material fuses in a time and temperature cycle below that at which permanent distortion or deformation of the glass would occur.

After being fired upon the glass, the colored enamel coating possesses the same coefficient of expansion and contraction as the glass so that it will not chip off or separate from the glass during the varying temperature conditions to which the sheet is subjected when in use. Thus, there is produced colored tempered glass sheets which will not only have a predetermined breaking pattern but also a colored surface of great permanency and durability. While there has been described hereinabove the coating of but one surface of the sheet, both surfaces thereof may be coated if desired and also any portion of the sheet may be coated by the use of suitable stencils or the like.

The product resulting from the above method is a colored glass sheet having a smooth vitreous surface and because of the special heat treating and quenching, the sheet is many times more resistant to shock, impact, and the like than was the original sheet of glass used for making the colored sheet and in fact more resistant to thermal and mechanical shock, impact, etc. than the average ceramic tile or panel customarily used for art or structural surfaces. The coating of vitrifiable colored enamels can be applied to glass surfaces having the original fire finish, glass surfaces which have been ground, sandblasted, or acid etched, or glass surfaces which have been ground and polished. Also, glass, regardless of its mechanical defects, such as seeds, blisters, ream, etc. can be used equally well in this method without detracting in any way from the general appearance and utility of the product. By the present method, a decorative glass tile or panel having color, opacity and exceeding resistance to shock can be manufactured in one heat treating operation.

If desired, instead of supporting the glass sheet in the manner shown in Figs. 1 and 2, during the application of the colored enamel thereto, the said sheet may be supported as shown in Figs. 4 and 5. With reference particularly to these figures, the glass sheet 26 is suspended at its upper edge by a plurality of relatively small tongs or hooks 27 in front of a glass background 28 lighted by the electric lamps 29 mounted in a frame 30 supported on a table or bench 31. The tongs 27 are the same as the tongs 20 in Fig. 3 and which support the glass sheet during tempering. By hanging the glass sheet in this manner during the application of the coloring material thereto, such as by means of a spray gun 32, the handling of the sheet is reduced to a minimum since the said sheet, after being colored and dried, can be positioned directly within the furnace A, shown in Fig. 3, or can be passed through a horizontal type furnace. The hanging of the glass sheet from the tongs before the application of the coloring material thereto rather than after reduces the tendency toward marring of the glass and disturbing of the enamel coat such as might occur when the glass is first colored and then hung from the tongs.

We claim:

1. In the manufacture of tempered glass sheets, wherein the sheet is first heated for a predetermined length of time at a predetermined temperature and then suddenly cooled so that if and when broken it will disintegrate into small and relatively harmless particles, the method of surface coloring the sheet simultaneous with and during the tempering thereof, which consists in first applying a layer of coloring material to one surface thereof, heating the sheet preliminary to cooling and simultaneously firing the coloring material thereon, and in employing a coloring material of such character that it will be properly fired upon the glass in the same time and temperature cycle as required for heating the glass preliminary to cooling and which will not affect the desired predetermined breaking characteristics of the glass.

2. In the manufacture of tempered glass sheets, wherein the sheet is first heated for a predetermined length of time at a predetermined temperature and then suddenly cooled so that if and when broken it will disintegrate into small and relatively harmless particles, the method of surface coloring the sheet simultaneous with and during the tempering thereof, which consists in first applying a layer of coloring material to one surface thereof, heating the sheet preliminary to cooling and simultaneously firing the coloring material thereon, and in employing a coloring material of such character that it will be properly fired upon the glass in the same time and temperature cycle as required for heating the glass preliminary to cooling and which will not affect the desired predetermined breaking characteristics of the glass, said coloring material being of such composition that it will possess, after firing, substantially the same coefficient of expansion and contraction as the glass.

3. In the manufacture of tempered glass sheets, wherein the sheet is first heated for a predetermined length of time at a predetermined temperature and then suddenly cooled so that if and when broken it will disintegrate into small and relatively harmless particles, the method of surface coloring the sheet simultaneous with and during the tempering thereof, which consists in first applying a layer of coloring material to one surface thereof, heating the sheet preliminary to cooling and simultaneously firing the coloring material thereon, and in employing a coloring material which will possess, after firing, substantially the same coefficient of expansion and contraction as the glass throughout the varying temperature conditions to which the glass is subjected when in use.

4. In the manufacture of tempered glass sheets, wherein the sheet is first heated for a predetermined length of time at a predetermined temperature and then suddenly cooled so that if and when broken it will disintegrate into small and relatively harmless particles, the method of surface coloring the sheet simultaneous with and during the tempering thereof, which consists in first applying a colored vitrifiable material to one surface thereof, heating the sheet preliminary to cooling and simultaneously fusing the coloring material thereon, and in employing a vitrifiable material having a relatively lower fusing point than the glass sheet and being of such character that it will be properly fired upon the glass in the same time and temperature cycle as required for heating the glass preliminary to cooling without affecting the desired predetermined breaking characteristics of the glass.

5. In the manufacture of tempered glass sheets, wherein the sheet is first heated for a predetermined length of time at a predetermined temperature and then suddenly cooled so that if and when broken it will disintegrate into small and relatively harmless particles, the method of surface coloring the sheet simultaneous with and during the tempering thereof, which consists in first applying a colored vitrifiable material to one surface thereof, heating the sheet preliminary to cooling and simultaneously fusing the coloring material thereon, and in employing a vitrifiable material having a relatively lower fusing point than the glass sheet and being of such character that it will be properly fired upon the glass in the same time and temperature cycle as required for heating the glass preliminary to cooling without affecting the desired predetermined breaking characteristics of the glass, said vitrifiable material being of such composition that it will possess, after firing, substantially the same coefficient of expansion and contraction as the glass.

6. In the manufacture of tempered glass sheets, wherein the sheet is first heated for a predetermined length of time at a predetermined temperature and then suddenly cooled so that if and when broken it will disintegrate into small and relatively harmless particles, the method of surface coloring the sheet simultaneous with and during the tempering thereof, which consists in first applying a colored vitrifiable material to one surface thereof, heating the sheet preliminary to cooling and simultaneously fusing the coloring material thereon, and in employing a vitrifiable material having a substantially lower fusing temperature than the glass sheet and which will possess, after firing, substantially the same coefficient of expansion and contraction as the glass during the varying temperature conditions to which the glass is subjected when in use.

7. As a new article of manufacture, a sheet of tempered glass having a coating of vitrifiable material fired upon one surface thereof and which possesses substantially the same coefficient of expansion and contraction as the glass throughout the varying temperature conditions to which the glass is subjected when in use.

8. As a new article of manufacture, a tempered sheet of glass having its outer surfaces under compression and its interior under tension and having a coating of vitrifiable material fired upon one surface thereof which possesses substantially the same coefficient of expansion and contraction as the glass throughout the varying temperature conditions to which the glass is subjected when in use.

9. As a new article of manufacture, a sheet of tempered glass having a color coat applied to one surface thereof formed of vitrifiable material including as one of its components pulverized glass having a fusing point lower than the fusing point of the tempered glass sheet and possessing substantially the same coefficient of expansion and contraction as the glass throughout the varying temperature conditions to which the glass is subjected when in use.

10. As a new article of manufacture, a tempered sheet of glass having its outer surfaces under compression and its interior under tension and having a color coat applied to one surface thereof formed of vitrifiable material including as one of its components pulverized glass having a fusing point lower than the fusing point of the tempered glass sheet and possessing substantially the same coefficient of expansion and contraction as the glass throughout the varying temperature conditions to which the glass is subjected when in use.

ORMOND H. PADDOCK.
ARTHUR McK. GREAVES-WALKER.